Jan. 18, 1927. 1,614,565
R. A. McWAID
METHOD OF AND APPARATUS FOR TESTING THE VISCOSITY OF MATTER
Filed Sept. 10, 1924 2 Sheets-Sheet 1
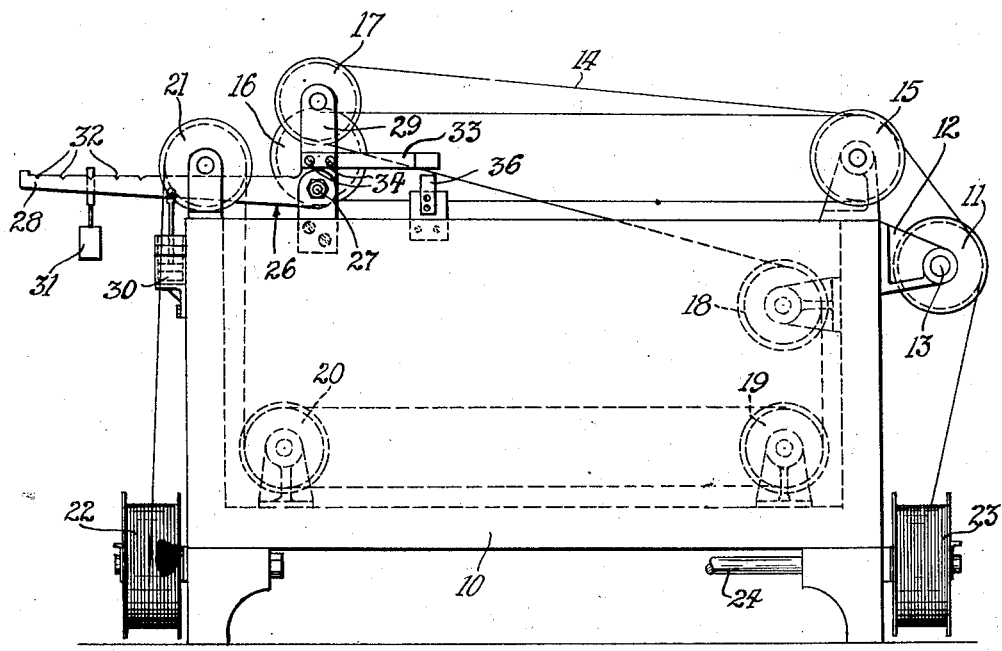

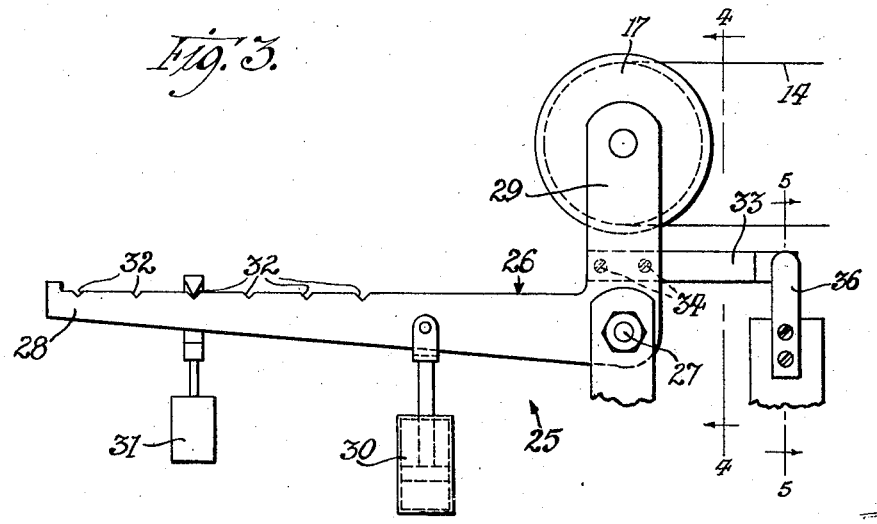
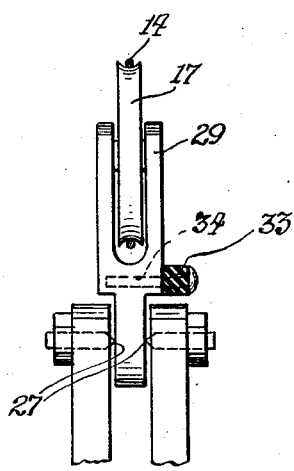
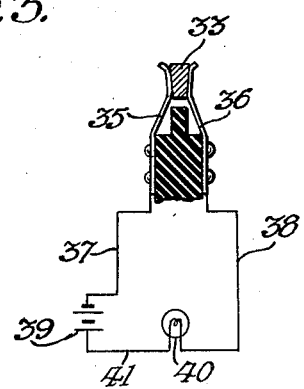

Patented Jan. 18, 1927.

1,614,565

UNITED STATES PATENT OFFICE.

RALPH ARTHUR McWAID, OF MAYWOOD, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR TESTING THE VISCOSITY OF MATTER.

Application filed September 10, 1924. Serial No. 736,825.

This invention relates to a method of and apparatus for testing the viscosity of matter.

The object of the invention is to provide an improved method of and apparatus for testing the viscosity of matter.

In accordance with the main features of the invention, a strand having been advanced through the material to be tested, is drawn over a pulley which is secured to one arm of a dynamometer, the tension of the strand rotating the dynamometer so as to control an electrical circuit by the cooperation of a switch blade carried by the dynamometer arm and suitable contact springs. The force required to rotate the dynamometer is varied by changing the position of a weight on a horizontal member which is integral with the dynamometer and rotates therewith.

The invention is more fully disclosed in the following description and in the accompanying drawings, in which—

Fig. 1 is a diagrammatic front elevation of a strand impregnating mechanism embodying the invention, and by which the method may be practiced;

Fig. 2 is a plan view of the same mechanism;

Fig. 3 is an enlarged view of a portion of Fig. 1 illustrating the invention;

Fig. 4 is a sectional view along the line 4—4 of Fig. 3, and

Fig. 5 is a sectional view along the line 5—5 of Fig. 3 showing how an electrical circuit may be incorporated with the mechanism.

Referring more particularly to the attached drawings in which like numerals are employed to designate similar members throughout the several views, the numeral 10 refers to a compound-containing receptacle which may be part of a mechanism for impregnating strand material, such as that described in Patent No. 1,365,414, issued January 11, 1921, to F. S. Kochendorfer. The numeral 11 refers to a capstan which is mounted on the receptacle 10 by means of a bracket 12. The capstan 11 driven by a shaft 13 leading to a source of power (not shown) is adapted to draw a strand 14 over drying rolls 15 and 16, and idler pulleys 17, 18, 19, 20 and 21, from a supply reel 22 as indicated in Fig. 1. A take-up reel 23 is driven by a shaft 24, leading to a source of power (not shown) and is adapted to receive the strand 14 as it is released from the capstan 11.

A tension indicating device of the nature of a dynamometer referred to generally by the numeral 25 is actuated by the tension of the strand 14 as it is drawn over the pulley 17 which is associated with the indicating mechanism. Referring more particularly to Fig. 3 a bell crank arm generally designated by the numeral 26 is pivoted at 27 and comprises a horizontal arm 28 and a vertical arm 29.

The horizontal arm 28 is provided with an oil dashpot 30 which prevents slight changes in the tension of the strand 14 from actuating the mechanism. A pendant weight 31 is adapted to be moved along the arm 28 into slotted portions 32 for a purpose which will be hereinafter described. The vertical arm 29 of the bell crank arm 26 is bifurcated to receive the pulley 17 previously referred to. A switch blade 33 is secured to the bell crank arm 29 by machine screws 34 and is adapted to be moved with the movement of the bell crank arm 26 into engagement with spring contacts 35 and 36, thus forming a circuit which can be traced from a battery 39 through a conductor 37, a contact spring 35, the switch blade 33, a contact spring 36, a conductor 38, a lamp 40, and a conductor 41 to the other side of the battery.

The mechanism is operated as follows: The strand 14 which is being treated with the liquid contained in the receptacle 10 is drawn over the pulleys and through the impregnating material by the tractive force of the capstan 11. The force exerted against the pulley 17 has the tendency to actuate the bell crank arm 26 pivotally on the point 27. This movement would be in a clockwise direction and would have the effect of closing the circuit between the spring contacts 35 and 36 and lighting the lamp 40. In starting the operation, therefore, the pendant weight 31 is placed at the suitable slotted portion 32 so that the normal and desirable tension of the strand 14 will preserve a balance on either end of the bell crank arm. If the viscosity of the liquid is increased so that greater tension than is normal and desirable exists in the strand, a clockwise motion of the bell crank arm will take place thereby closing the above mentioned circuit and lighting the lamp 40, which may serve as a signal to the operator to correct the condition of the impregnating liquid.

It is obvious that the invention is not limited to the embodiment shown in the attached drawings and described above. Instead of the lamps as described, any sensible means may be provided which will have the effect desired of giving a signal to the operator. It is also obvious that although the testing means herein described is associated directly with a strand in the process of being treated or impregnated, which strand is normally passing through the liquid to be tested when the mechanism is in a state of operation, nevertheless a strand can be drawn through the liquid for the sole purpose of testing the liquid, and independent of impregnating or other operations.

What is claimed is:

1. A method of testing matter, which consists in advancing a strand therethrough for the purpose of treating the strand with the matter, and simultaneously determining the viscosity of the matter by indicating the tension existing in the strand.

2. A mechanism for testing the viscosity of matter, comprising a receptacle containing the matter to be tested, means for advancing a strand through the matter contained in said receptacle for causing its impregnation, and means responsive in accordance with the force exerted by said advancing means in advancing said strand through said matter for indicating the viscosity thereof.

3. A mechanism for testing the viscosity of matter, comprising a receptacle containing the matter to be tested, means for advancing an element through said matter, a dynamometer associated with said element for indicating the force required to advance the element and means for preventing minor variations in the force required to advance said element from actuating the dynamometer.

4. A mechanism for testing the viscosity of matter comprising an electrical circuit, a receptacle containing the matter to be tested, means for advancing an element through said matter, and means controlled by the force exerted by said advancing means in advancing said element for controlling the electrical circuit.

5. A mechanism for testing the viscosity of matter, comprising an electrical circuit, a receptacle containing the matter to be tested, means for advancing an element through said matter, means controlled by the force required to advance said element for controlling the electrical circuit, and means for changing the force exerted by said advancing means in advancing said element through said matter.

6. A mechanism for testing the viscosity of material, comprising an electric switch, a receptacle containing the material to be tested, means for advancing an element through said material, a dynamometer arm, and means responsive to the force exerted by said advancing means in advancing said element, for oscillating said dynamometer arm to control the electrical switch.

7. A mechanism for testing the viscosity of material, comprising an electrical circuit, a receptacle containing the material to be tested, means for advancing an element, a dynamometer arm, and means responsive to the force exerted by said advancing means in advancing said element through said material for oscillating said dynamometer arm to control the electrical circuit when a predetermined viscosity exists within the material.

8. The combination with a mechanism for impregnating material with matter in a fluid state, of means for causing a relative movement between the material and the matter, and means responsive to the force exerted in causing relative movement between the material and the matter for indicating when a predetermined viscosity exists in said matter.

9. The combination with a mechanism for impregnating material in strand form, comprising a receptacle adapted to contain an impregnating fluid, and means for advancing the strand through the impregnating fluid, of means responsive to the tension of the strand for indicating when a predetermined viscosity exists in the impregnating fluid.

10. The combination with a mechanism for treating material in strand form, comprising a receptacle adapted to contain a fluid for treating the strand, and means for advancing the strand through said fluid, of a dynamometer actuated by the tension existing in the strand while it is being advanced, to determine the viscosity of the fluid.

11. The combination with a mechanism for impregnating material in strand form, comprising a receptacle adapted to contain an impregnating liquid, and means for advancing a strand through said impregnating fluid, of means responsive to the tension of the strand for indicating when a predetermined viscosity exists in the impregnating fluid, and means for controlling said second mentioned means to cause it to respond to varying degrees of tension in the strand.

In witness whereof, I hereunto subscribe my name this 3rd day of September A. D., 1924.

RALPH ARTHUR McWAID.